No. 714,480.

Patented Nov. 25, 1902.

G. W. HARRIS.

KITCHEN CABINET.

(Application filed Nov. 27, 1901.)

(No Model.)

2 Sheets—Sheet 1.

Witnesses
Howard D. Orr.
B. G. Foster

Inventor,
George W. Harris,
By
E. G. Siggers,
Attorney

No. 714,480. Patented Nov. 25, 1902.

G. W. HARRIS.

KITCHEN CABINET.

(Application filed Nov. 27, 1901.)

(No Model.)

2 Sheets—Sheet 2.

Witnesses
Howard D. Orr.
B. G. Foster

George W. Harris, Inventor.
By E. G. Siggers.
Attorney

THE NORRIS PETERS CO., PHOTO-LITHO., WASHINGTON, D. C.

UNITED STATES PATENT OFFICE.

GEORGE WILLIAM HARRIS, OF PERRY, OKLAHOMA TERRITORY.

KITCHEN-CABINET.

SPECIFICATION forming part of Letters Patent No. 714,480, dated November 25, 1902.

Application filed November 27, 1901. Serial No. 83,867. (No model.)

*To all whom it may concern:*

Be it known that I, GEORGE WILLIAM HARRIS, a citizen of the United States, residing at Perry, in the county of Noble, Territory of Oklahoma, have invented a new and useful Kitchen-Cabinet, of which the following is a specification.

The present invention relates to kitchen-cabinets; and the object thereof is to provide an article of furniture of this character which will be useful and convenient and may be employed in many culinary operations.

One of the features of the invention resides in the construction of the interior of the cabinet, the arrangement being such that bread may be raised therein and the space for the same may be easily enlarged or contracted to the amount of the batch.

A further feature resides in the construction of the closure for the cabinet, the same being so made that it can be utilized for kneading bread and other purposes without interfering with the gaining of access to the interior, and, furthermore, in providing a supplemental cover for the closure, which cover may be employed as a leaf or folded out of the way when not wanted.

The preferred form of construction is illustrated in the accompanying drawings, and described in the following specification; but the right is reserved to make such slight changes in unimportant details as the scope of the claims will permit.

Figures 1, 2, 7, 9:
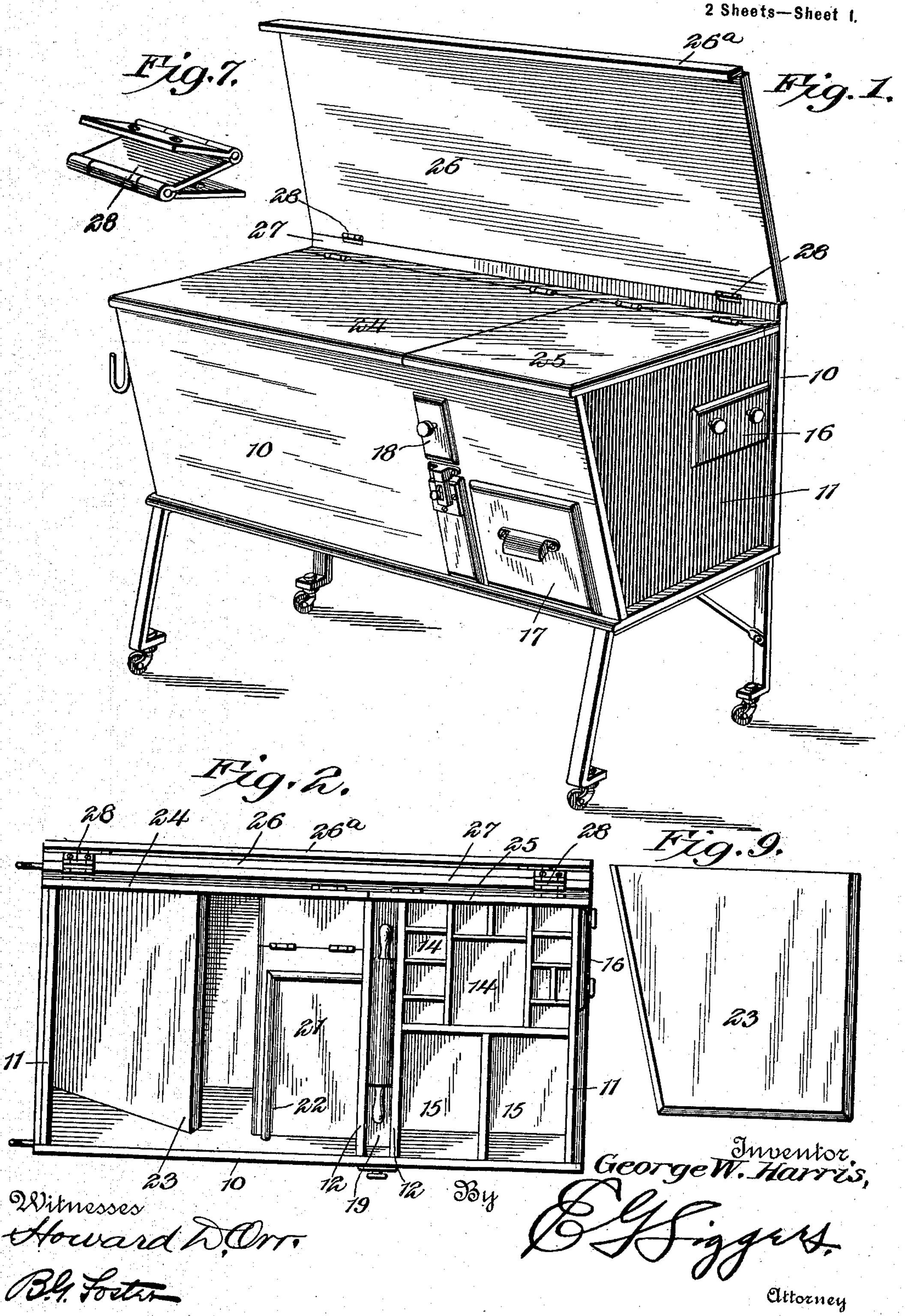
Figures 3, 4, 5, 6, 8:
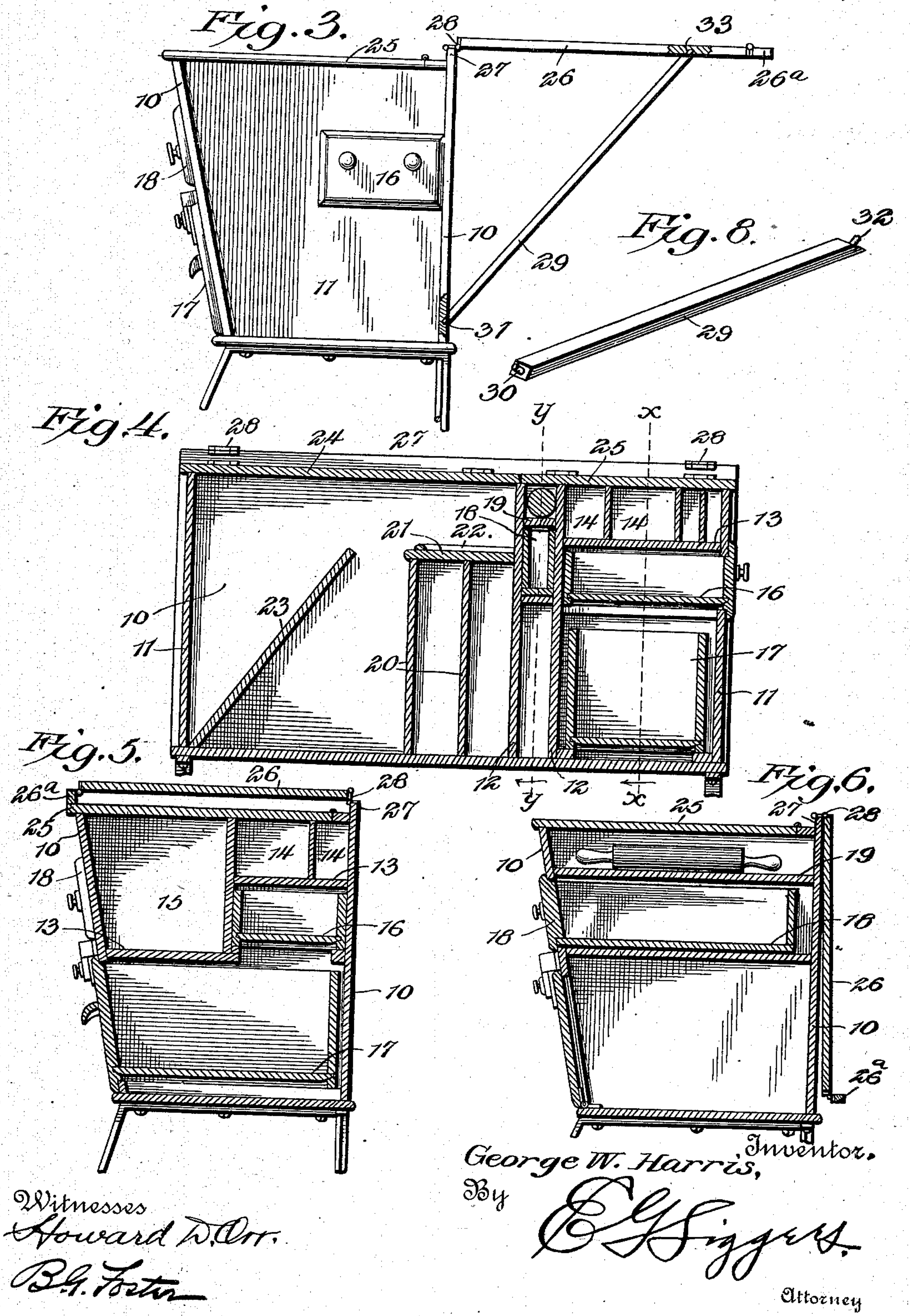

In the drawings, Figure 1 is a perspective view of the cabinet with the leaf or supplemental cover raised. Fig. 2 is a top plan view with both closures raised and the leaf dropped. Fig. 3 is an end view of the cabinet, showing the leaf supported in horizontal position. Fig. 4 is a longitudinal sectional view. Fig. 5 is a transverse sectional view taken on the line *x x* of Fig. 4. Fig. 6 is a similar view taken on the line *y y* of Fig. 4. Fig. 7 is a detail view of one of the triple-leaf hinges employed. Fig. 8 is a detail view of one of the supports for the leaf. Fig. 9 is a detail view of the movable partition.

Similar numerals of reference designate corresponding parts in the several figures of the drawings.

The body of the receptacle comprises side and end walls 10 and 11, one of said side walls, preferably the front, being disposed at an inclination to the other, so that the receptacle tapers toward its lower end. The interior of the receptacle is divided by a pair of transversely-disposed main walls 12 into two sections, which sections are subdivided in the following manner: The section on the right hand is provided with a pair of bottoms 13, arranged at different depths, and the space above the same is subdivided into spice and condiment pockets 14 and the two larger compartments designated 15, which are intended for holding sugar and flour. Beneath these several compartments are located drawers 16 and 17, the drawer 16 being arranged beneath the small pockets and opening at the end of the body, while the drawer 17 fills the entire space at the bottom of the division and opens at the front of the cabinet. The space between the two division-walls 12 forms at its lower end a receptacle for plates and the like, and just above the same is arranged a drawer 18, forming a receptacle for knives and similar instruments. Above this drawer is secured a bottom 19, forming a transversely-disposed pocket in the upper portion of the cabinet, this pocket being designed to receive a rolling-pin.

The other main division of the receptacle to the left of the walls is subdivided by a pair of transversely-disposed partitions 20 into independent receptacles for cornmeal and Graham flour. These partitions 20 terminate short of the upper edge of the side of the cabinet, and the receptacles formed thereby are closed by a hinged cover 21 forming a shelf and having a beading 22, located on its outer face, which will retain a flour-sifter placed upon said shelf. The remaining space of this division is intended for flour, and located therein is a movable partition 23, which partition is disposed at an inclination to the end walls of the cabinet and tapers toward its lower end, so as to conform to the shape of the flour-receptacle. Its edges are beveled, so as to fit snugly against the inner face of the sides and bottom, and it is held in place by its frictional engagement with said sides. This partition is intended to divide the flour-receptacle into two compartments and forms a space in which the "sponge" is placed during the manufacture of bread. This partition may be moved as near to or as far from the end wall 11 as may be necessary to form a space sufficient to receive the amount of the batch.

Covering the entire top of the cabinet is a closure divided into two independent sections 24 and 25, which sections are hinged at their rear edges to the rear edge of the cabinet. One of these sections covers the right-hand portion of the cabinet containing the condiment-pockets, sugar, and small flour-receptacle and the rolling-pin pocket, while the other covers the remainder. The upper surfaces of these covers are intended to be employed for kneading bread and the like. In order to keep this surface clean and permit the cabinet being used for other and rougher purposes, a supplemental leaf 26 is employed, which leaf normally covers both sections and is pivoted to an upstanding ledge 27, located at the rear edge of the cabinet by means of triple leaf-hinges 28, which thus permits of the leaf being swung from its position over the cover-sections 24 and 25 to a position alongside of the rear face of the cabinet, as shown in Fig. 2. It is provided upon its free side edge with a hinged strip $26^a$, which forms a support that rests upon the cover-sections when the leaf is located over the same. This leaf may also be arranged in horizontal position, so that the entire cabinet will form a table, and to this end supporting-braces 29 are employed, the lower ends of said braces being provided with pins 30, which fit in sockets 31, formed in the rear wall of the cabinet, while their upper ends are provided with similar pins 32, that engage in similar sockets 33 in the outer face of the leaf. When in this horizontal position, the strip is swung down out of the way, as shown in Fig. 3. By this means it will be seen that the leaf when placed upon the sectional closure completely protects the same from injury and may be employed in rough work, such as ironing and the like. Furthermore, it may be thrown to horizontal position to form additional supporting-surface, or it can be dropped behind the cabinet, where it is completely out of the way.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a kitchen-cabinet, a receptacle having end and side walls, said side walls being arranged in convergent relation toward their lower edges, and a rigid movable partition extending across the receptacle and having its side edges disposed in convergent relation toward their lower ends, the angle of convergence of said side edges being different from the angle of convergence of the side walls of the receptacle, said partition being located at an inclination to the end walls of the receptacle, loosely resting upon the converging side walls, and supported thereon against movement.

2. In a kitchen-cabinet, a receptacle having end and side walls, said side walls being arranged in convergent relation toward their lower edges, and a rigid movable partition extending across the receptacle and having its side edges disposed in convergent relation toward their lower ends, the angle of convergence of said side edges being of less degree than the angle of convergence of the side walls of the receptacle, whereby said partition when in place in the receptacle, will be disposed at an inclination to the end walls, and the convergent edges will rest upon the side walls, the edges of the partition being beveled to conform to the walls against which they rest.

In testimony that I claim the foregoing as my own I have hereto affixed my signature in the presence of two witnesses.

GEORGE WILLIAM HARRIS.

Witnesses:
E. E. GIBBENS,
C. L. WALKER.